(12) United States Patent
Hood

(10) Patent No.: US 7,337,134 B1
(45) Date of Patent: Feb. 26, 2008

(54) SHAREHOLDER VALUE ADD FOR FINANCIAL PROCESSING IN A RELATIONAL DATABASE MANAGEMENT SYSTEM

(75) Inventor: George Robert Hood, Poway, CA (US)

(73) Assignee: Teradata Corp., Miamisburg, OH (US)

(*) Notice: Subject to any disclaimer, the term of this patent is extended or adjusted under 35 U.S.C. 154(b) by 1235 days.

(21) Appl. No.: 09/845,851

(22) Filed: Apr. 30, 2001

(51) Int. Cl.
*G06Q 40/00* (2006.01)
(52) U.S. Cl. ...................................................... 705/35
(58) Field of Classification Search ................... 705/35, 705/36, 38, 1, 30, 8, 36 T
See application file for complete search history.

(56) References Cited

U.S. PATENT DOCUMENTS 5,189,608 A * 2/1993 Lyons et al. .................. 705/30

(Continued)

FOREIGN PATENT DOCUMENTS

EP      1208495     * 10/2000

OTHER PUBLICATIONS

Curley, Bob, "Royal Bank unearths profitability solution," Bank Systems & Technology, Apr. 2000, 2 pages.*

(Continued)

*Primary Examiner*—Andrew Joseph Rudy
(74) *Attorney, Agent, or Firm*—Gates & Cooper

(57) ABSTRACT

A financial processing system that accesses account, event and organization attributes from a relational database management database, wherein: (1) the account attributes comprise data about accounts being measured, (2) the event attributes comprise data about account-related transactions, and (3) the organization attributes comprise data about the organization's financial status. Profitability calculations are performed in the computer using the account, event and organization attributes accessed from the relational database management system, as well as one or more profit factors and one or more rules. The profitability calculations comprise the following:

| Profit $(a_i)$ | = | Net Interest Revenue (NIR) $(a_i)$ |
| | + | Other Revenue (OR) $(a_i)$ |
| | − | Direct Expense (DE) $(a_i)$ |
| | − | Indirect Expense (IE) $(a_i)$ |
| | − | Risk Provision (RP) $(a_i)$ | for an account $a_i$. Thereafter, one or more earnings calculations are performed in the computer using results from the profitability calculations, as well as shareholder value add attributes and tax adjustment attributes accessed from the database. The earnings calculations comprise the following:

$E(a_i) = [\text{Profit}(a_i) - SVA(a_i)](1 - \text{EffectiveTaxRate})$ wherein:
EffectiveTaxRate=$(1 - \text{tax rate}_2)*(\text{tax rate}_1) + \text{tax rate}_2$, tax rate$_1$ and tax rate$_2$ are effective rates, tax rate$_2$ is deducted from income, and tax rate$_1$ is not deducted from income,
SVA$(a_i)$=Risk Adjusted Hurdle Rate*Allocated Capital,
Risk Adjusted Hurdle Rate=$\alpha + \beta(a_i)*x$,
$\alpha$ is a risk free rate on capital,
x is a market premium of a Financial Institution's capital relative to the market, and
$\beta(a_i)$ is a function of a cohort of accounts in which $a_i$ is a member.

6 Claims, 3 Drawing Sheets

U.S. PATENT DOCUMENTS

| | | | |
|---|---|---|---|
| 5,237,498 A * | 8/1993 | Tenma et al. | 705/30 |
| 5,249,120 A | 9/1993 | Foley | |
| 5,615,109 A * | 3/1997 | Eder | 705/8 |
| 5,655,085 A * | 8/1997 | Ryan et al. | 705/4 |
| 5,712,987 A | 1/1998 | Waits et al. | |
| 5,721,831 A | 2/1998 | Waits et al. | |
| 5,819,237 A | 10/1998 | Garman | |
| 5,911,135 A | 6/1999 | Atkins | |
| 5,991,743 A | 11/1999 | Irving et al. | |
| 6,026,382 A | 2/2000 | Kalthoff | |
| 6,085,175 A | 7/2000 | Gugel et al. | |
| 6,112,190 A * | 8/2000 | Fletcher et al. | 705/38 |
| 6,233,566 B1 | 5/2001 | Levine et al. | |
| 6,240,399 B1 | 5/2001 | Frank et al. | |
| 6,249,770 B1 * | 6/2001 | Erwin et al. | 705/10 |
| 6,253,192 B1 | 6/2001 | Corlett et al. | |
| 6,275,813 B1 | 8/2001 | Berka | |
| 6,292,787 B1 | 9/2001 | Scott et al. | |
| 6,343,272 B1 * | 1/2002 | Payne et al. | 705/4 |
| 6,360,210 B1 * | 3/2002 | Wallman | 705/36 |
| 6,389,380 B1 * | 5/2002 | Bankes | 703/17 |
| 6,393,406 B1 * | 5/2002 | Eder | 705/7 |
| 6,477,510 B1 * | 11/2002 | Johnson | 705/30 |
| 6,571,219 B1 * | 5/2003 | Spivey | 705/36 |
| 6,957,191 B1 * | 10/2005 | Belcsak et al. | 705/38 |
| 2002/0026394 A1 * | 2/2002 | Savage et al. | 705/34 |

OTHER PUBLICATIONS

John R. Johnson, Raising Relationships, Bank Marketing, Jun. 1999, pp. 16-24.*

John R. Johnson, Raising Relationships, Bank Marketing, May 1999, pp. 30-36, footnote 1.*

Kassing, Jay, "Profitability: Growing the Bottom Line," CSI, 1999, 43 pages.

"Canadian Bank Mines for Data-based Gold," Action Items, Dec. 2, 1997, 2 pages.

"Bank of Ireland Selects Compaq AlphaServers to Help Improve Profitability Management," Dec. 3, 1998, Compaq, 2 pages.

"Marquis Tops 300 MCIF-CRM Data Mart Clients Worldwide," Apr. 18, 2000, 2 pages.

Curley, Bob, "Royal Bank unearths profitability solution", Bank Systems & Technology, Apr. 2000, 2 pages.

Middleton, Arthur, "How Profitability Analysis is Used in Financial Services Marketing", date unknown, 3 pages.

* cited by examiner

SHAREHOLDER VALUE ADD FOR FINANCIAL PROCESSING IN A RELATIONAL DATABASE MANAGEMENT SYSTEM

CROSS REFERENCE TO RELATED APPLICATIONS

This application is related to the following co-pending and commonly assigned patent applications:

Utility Application Ser. No. 09/845,461, entitled "TAX ADJUSTMENT FOR FINANCIAL PROCESSING IN A RELATIONAL DATABASE MANAGEMENT SYSTEM," filed on Apr. 30, 2001, by George Robert Hood; and Utility Application Ser. No. 09/845,924, entitled "AMORTIZATION FOR FINANCIAL PROCESSING IN A RELATIONAL DATABASE MANAGEMENT SYSTEM," filed on Apr. 30, 2001, by George Robert Hood;

both of which applications are incorporated by reference herein.

This application is a continuation-in-part of the following co-pending and commonly assigned patent applications:

Utility application Ser. No. 09/608,355, entitled "ADVANCED AND BREAKTHROUGH NET INTEREST REVENUE IMPLEMENTATION FOR FINANCIAL PROCESSING IN A RELATIONAL DATABASE MANAGEMENT SYSTEM," filed on Jun. 29, 2000, by George Robert Hood and Paul H. Phibbs, Jr.;

Utility application Ser. No. 09/610,646, entitled "BASIC AND INTERMEDIATE NET INTEREST REVENUE IMPLEMENTATION FOR FINANCIAL PROCESSING IN A RELATIONAL DATABASE MANAGEMENT SYSTEM," filed on Jun. 29, 2000, by George Robert Hood and Paul H. Phibbs, Jr.;

Utility application Ser. No. 09/608,681, entitled "OTHER REVENUE IMPLEMENTATION FOR FINANCIAL PROCESSING IN A RELATIONAL DATABASE MANAGEMENT SYSTEM," filed on Jun. 29, 2000, by George Robert Hood;

Utility application Ser. No. 09/608,675, entitled "DIRECT EXPENSE IMPLEMENTATION FOR FINANCIAL PROCESSING IN A RELATIONAL DATABASE MANAGEMENT SYSTEM," filed on Jun. 29, 2000, by George Robert Hood;

Utility application Ser. No. 09/608,342, entitled "INDIRECT EXPENSE IMPLEMENTATION FOR FINANCIAL PROCESSING IN A RELATIONAL DATABASE MANAGEMENT SYSTEM," filed on Jun. 29, 2000, by George Robert Hood; and Utility application Ser. No. 09/608,682, entitled "RISK PROVISION IMPLEMENTATION FOR FINANCIAL PROCESSING IN A RELATIONAL DATABASE MANAGEMENT SYSTEM," filed on Jun. 29, 2000, by George Robert Hood;

all of which are incorporated by reference herein.

BACKGROUND OF THE INVENTION

1. Field of the Invention

This invention relates in general to financial processing systems performed by computers, and in particular, to the implementation of "shareholder value add" calculations for financial processing using data accessed from a relational database management system.

2. Description of Related Art

Financial processing systems provide tools for financial analysis of accounting data. Typically, each financial processing system operates in a unique way and approaches financial analysis differently. Some financial processing systems are advanced in their approach to profitability calculations, and others are still at a more basic level. In addition, there is no agreement as to the rules for profitability calculations, outside of generally accepted accounting policies that external auditors use.

Yet, the majority of financial processing systems attempt to use profitability calculations to differentiate between sources of revenues and expenses. There is a need, then, for a flexible approach to profitability calculations in terms of the overall metric, as well as the type of data used.

SUMMARY OF THE INVENTION

A Value Analyzer is a data-driven computer-facilitated financial processing system that accesses account, event and organization attributes from a relational database management database, wherein: (1) the account attributes comprise data about accounts being measured, (2) the event attributes comprise data about account-related transactions, and (3) the organization attributes comprise data about the organization's financial status. Profitability calculations are performed in the computer using the account, event and organization attributes accessed from the relational database management system, as well as one or more profit factors and one or more rules. The profitability calculations comprise the following:

| Profit ($a_i$) | = | Net Interest Revenue (NIR) ($a_i$) |
|---|---|---|
| | + | Other Revenue (OR) ($a_i$) |
| | − | Direct Expense (DE) ($a_i$) |
| | − | Indirect Expense (IE) ($a_i$) |
| | − | Risk Provision (RP) ($a_i$) | for an account $a_i$.

Thereafter, one or more earnings calculations are performed in the computer using results from the profitability calculations, as well as shareholder value add attributes and tax adjustment attributes accessed from the database. The earnings calculations comprise the following:

$$E(a_i) = [NIR(a_i) + OR(a_i) - DE(a_i) - IE(a_i) - RP(a_i) - SVA(a_i)]*(1-\text{EffectiveTaxRate})$$

or $$E(a_i) = [\text{Profit}(a_i) - SVA(a_i)]*(1-\text{EffectiveTaxRate})$$

wherein:

EffectiveTaxRate = $(1-\text{tax rate}_1)*(\text{tax rate}_2)+\text{tax rate}_2$, tax rate$_1$ and tax rate$_2$ are effective rates, tax rate$_2$ is deducted from income, and tax rate$_1$ is not deducted from income (e.g., tax rate$_1$ is a federal income tax rate and tax rate$_2$ is a state income tax rate), SVA($a_i$) = Risk Adjusted Hurdle Rate*Allocated Capital, Risk Adjusted Hurdle Rate = $\alpha + \beta(a_i)*x$, $\alpha$ is a risk free rate on capital, x is a market premium of a Financial Institution's capital relative to the market, and $\beta(a_i)$ is a function of a cohort of accounts in which $a_i$ is a member.

One or more total earnings calculations may be performed in the computer using results from the earnings calculations, wherein the total earnings calculations comprise:

$$\text{Total Earnings} = \sum_i [\text{Earnings}(a_i)]$$

for all accounts $a_i$.

BRIEF DESCRIPTION OF THE DRAWINGS

Referring now to the drawings in which like reference numbers represent corresponding parts throughout.

DETAILED DESCRIPTION OF THE PREFERRED EMBODIMENT

Figure 1:
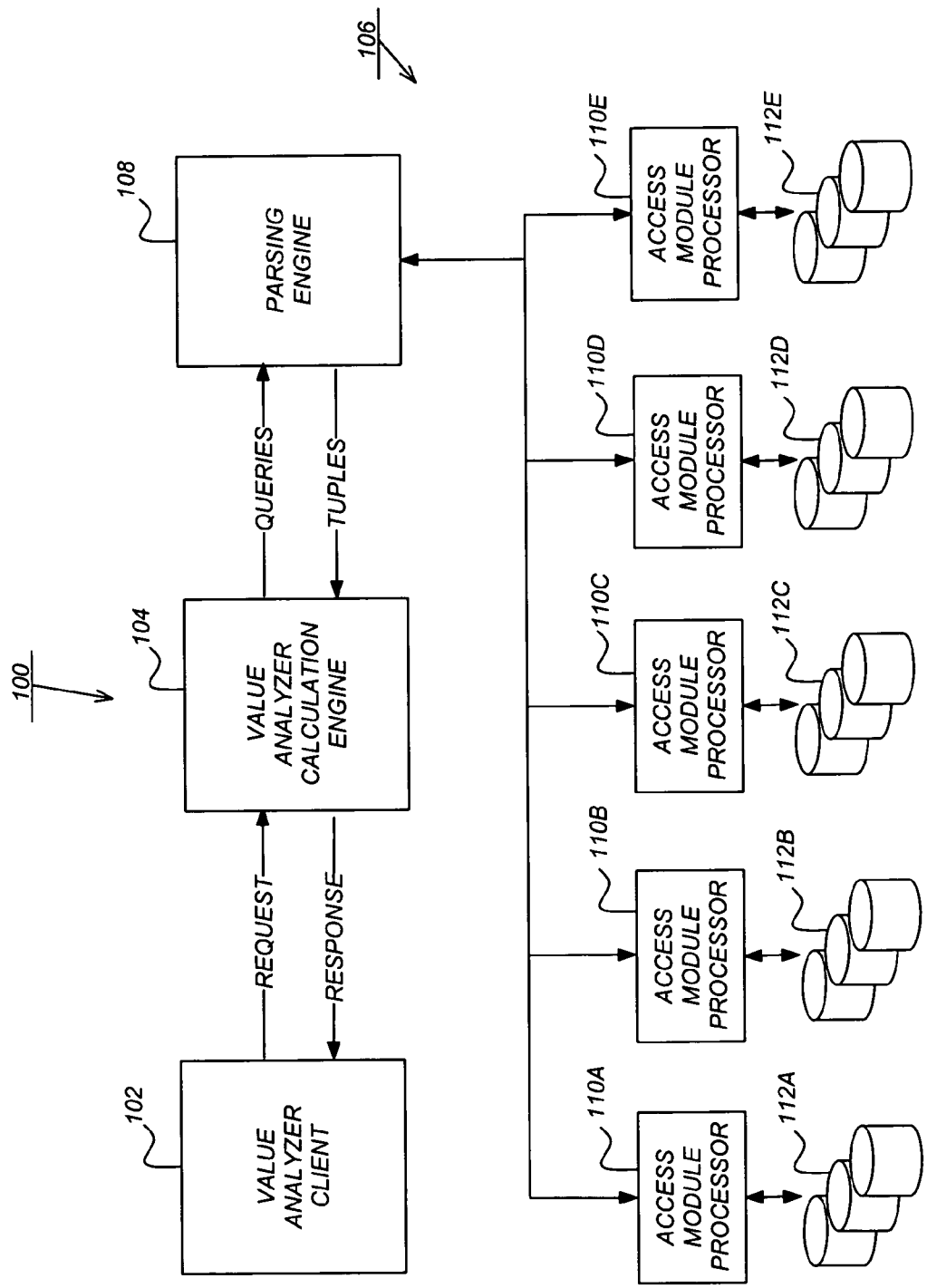
FIG. 1 illustrates an exemplary hardware and software environment according to the preferred embodiment of the present invention.

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

The Value Analyzer is a data-driven computer-facilitated financial model that provides accurate and consistent profitability calculations using account, event and organization data stored in a relational database management system (RDBMS), wherein: (1) the account attributes comprise data about accounts being measured, (2) the event attributes comprise data about account-related transactions, and (3) the organization attributes comprise data about the organization's financial status. The profitability calculations performed by the Value Analyzer rely on a Five Factor Atomic Profit Metric (FFAPM):

| Profit | = | Net Interest Revenue (NIR) |
| | + | Other Revenue (OR) |
| | − | Direct Expense (DE) |
| | − | Indirect Expense (IE) |
| | − | Risk Provision (RP) |
| | = | NIR + OR − DE − IE − RP |

In the above equation, it is assumed that the sign of elements that reduce profit are negative and those that contribute are positive.

Each of the five factors of FFAPM are defined below:

Net Interest Revenue. This component comprises interest revenue, and is the largest component of profitability (e.g., from loans, deposits, cash, etc.).

Other Revenue. This component comprises non-interest revenue (e.g., fees and commissions), including those driven by events (e.g., open account, excessive counter withdrawals, early payout penalties, etc.).

Direct Expense. This component comprises expenses driven by events that are attributable to accounts.

Indirect Expense. This component comprises expenses that are not attributable to specific accounts. This includes expenses that relate to the cost of doing business that are not driven by account or event activity, such as those that arise from overheads, inefficiencies or differences between standard and actual costs (e.g., the CEO's salary, etc.).

Risk Provision. This component comprises the expected cost of risks that arise from the uncertainties of doing business, e.g., market risks, customer credit, competition, operations, regulatory risks, political risks, etc.

Each of these five factors can be measured for a desired period (daily, weekly, monthly, quarterly, etc.). Moreover, each factor is essentially discrete and independent with fundamentally different characteristics, which strengthens the user's ability to fully utilize the output to determine relationships between account, event and organization data, and enable consistent multiple dimensional aggregation.

The FFAPM is "atomic" in that profitability is computed using data stored in a relational database management system (RDBMS). There are three aspects to this:

components of profitability may be measured below the account level (at events which make up account activity over an accounting period) and accumulated to the account, components of profitability may be measured directly at the account level (such as interest paid or earned for an accounting period), components of profitability may be known, obtained, or aggregated at a higher level, and may be apportioned down to specific accounts and events according to various rules.

The Value Analyzer generally defines "indirect" components of profitability to be those which must be apportioned to accounts and "direct" components to be those which are either computed at the account level, or are rolled up to the account level from lower level events.

Hardware and Software Environment

FIG. 1 illustrates an exemplary hardware and software environment according to the preferred embodiment of the present invention. In the exemplary environment, a computer system 100 implements a financial processing system in a three-tier client-server architecture, wherein the first or client tier provides a Value Analyzer Client 102 that may include, inter alia, a graphical user interface (GUI), the second or middle tier provides a Value Analyzer Calculation Engine 104 for performing profitability calculations as described later in this application, and the third or server tier comprises a Relational DataBase Management System (RDBMS) 106 that stores the data and metadata necessary for performing the profitability calculations from the data and metadata stored in a relational database. The first, second, and third tiers may be implemented in separate machines, or may be implemented as separate or related processes in a single machine.

In the preferred embodiment, the Value Analyzer Client 102 and the Value Analyzer Calculation Engine 104 together are referred to as the Value Analyzer. Generally, the Value Analyzer Client 102 includes a graphical user interface (GUI) for operators of the system 100, wherein requests are transmitted to the Value Analyzer Calculation Engine 104 and responses are received therefrom. The Value Analyzer Calculation Engine 104 performs the profitability calculations and other processing, including commands or functions for performing various search and retrieval functions in the RDBMS 106, wherein queries are transmitted to the RDBMS 106 as requests and tuples are received therefrom as responses. The Value Analyzer Client 102 and the Value Analyzer Calculation Engine 104 may be implemented in separate machines, or may be implemented as separate or related processes in a single machine.

In the preferred embodiment, the RDBMS 106 includes at least one Parsing Engine (PE) 108 and one or more Access Module Processors (AMPs) 110A-110E storing the relational database in one or more data storage devices 112A-112E. The Parsing Engine 108 and Access Module Processors 110 may be implemented in separate machines, or may be implemented as separate or related processes in a single machine. The RDBMS 106 used in the preferred embodiment comprises the Teradata® RDBMS sold by NCR Corporation, the assignee of the present invention, although other DBMS's could be used.

In the preferred embodiment, the system 100 may use any number of different parallelism mechanisms to take advantage of the parallelism offered by multiple Access Module Processors 110. Further, data within the relational database may be fully partitioned across all data storage devices 112 in the system 100 using hash partitioning or other partitioning methods.

Generally, the Value Analyzer Client 102, Value Analyzer Calculation Engine 104, RDBMS 106, Parsing Engine 108, and/or Access Module Processors 110A-110E comprise logic and/or data tangibly embodied in and/or accessible from a device, media, carrier, or signal, such as RAM, ROM, one or more of the data storage devices 112A-112E, and/or a remote system or device communicating with the computer system 100 via one or more data communications devices.

However, those skilled in the art will recognize that the exemplary environment illustrated in FIG. 1 is not intended to limit the present invention. Indeed, those skilled in the art will recognize that other alternative environments may be used without departing from the scope of the present invention. In addition, it should be understood that the present invention may also apply to components other than those disclosed herein.

Value Analyzer Data Flow

Figure 2:
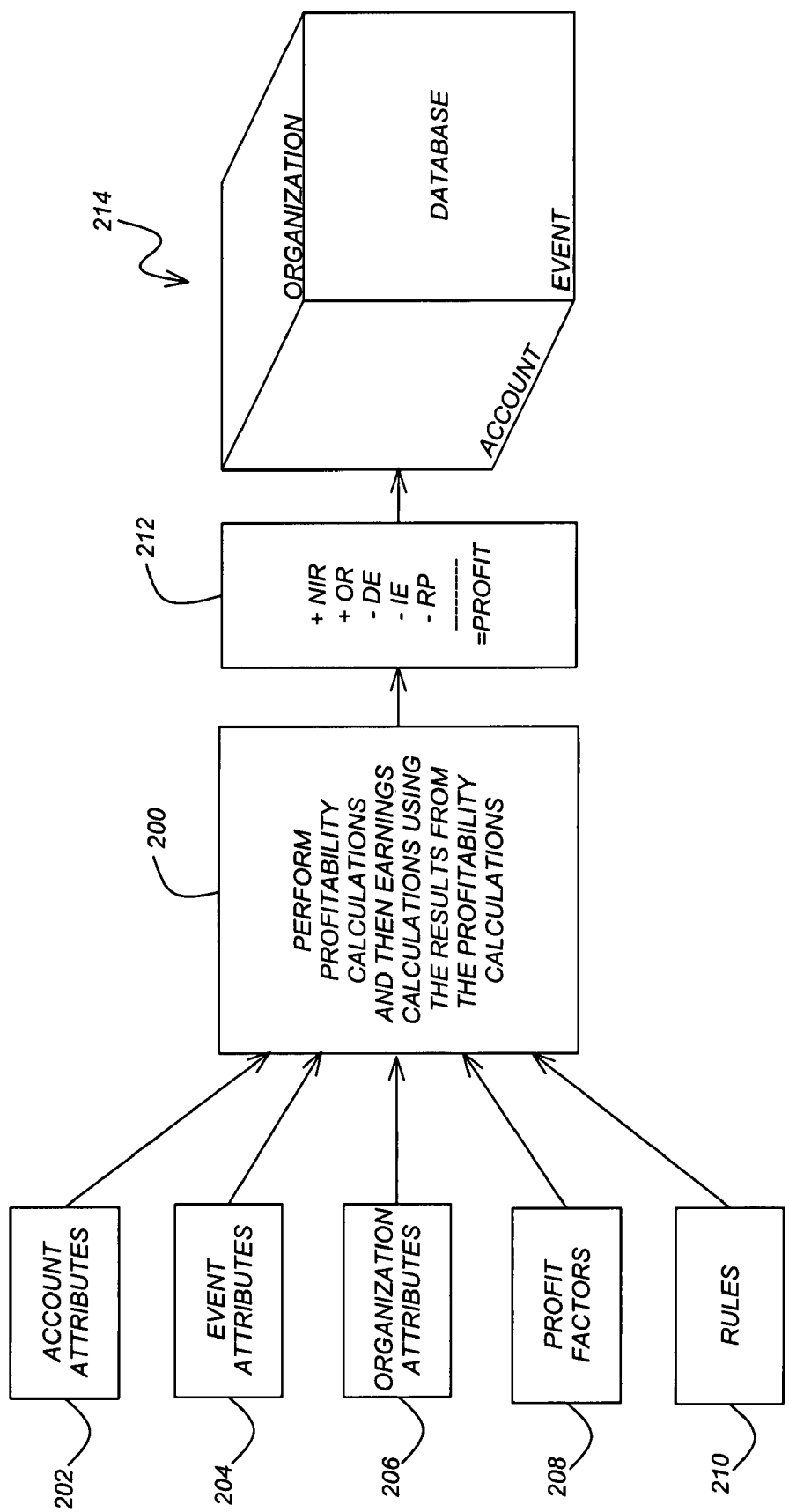
FIG. 2 is a data flow diagram that illustrates the operation of the Value Analyzer according to the preferred embodiment of the present invention.

FIG. 2 is a data flow diagram that illustrates the operation of the Value Analyzer Calculation Engine 104 according to the preferred embodiment of the present invention. Within the Value Analyzer Calculation Engine 104, one or more Profitability Calculations 200 accept a number of inputs including Account Attributes 202, Event Attributes 204, Organization Attributes 206, and Profit Factors 208. Thereafter, the Profitability Calculations 200 invoke one or more Rules 210 that generate the FFAPM 212, which in turn are used to create the Database 214. The Database 214 may be represented along account, event, or organization dimensions, or along other dimensions as may be required. These elements are described in more detail below.

Input Definitions

Account Attributes 202 comprise data about the accounts being measured. This data includes: balance, rate (or interest accrued), product identification, limits, expected default frequency, and various dates (e.g., open, rate reset, last payment, next payment, maturity, etc.).

Event Attributes 204 comprise data about account-related events or transactions. This data includes: account identification, event or transaction amounts, event or transaction location, event or transaction time, counter-party identification, event or transaction type (e.g., loan payment, interest paid, loan draw down amount, etc.).

Organization Attributes 206 comprise data about the financial status of the organization. This data includes: balance sheet and profit statement amounts aggregated by the legal or management entities that own the account base being measured.

Profit Factors 208 include parameter values necessary to perform the Profitability Calculations 200. The major classifications of this data include:

Funds transfer rates are pricing methods that require matched maturity opportunity rates for use in valuing each account's marginal use or source of internal funds.

Unit costs are used for Direct Expense calculations, where a total cost is provided as an Organization Attribute 206 and the Unit Cost is then derived by dividing total cost by actual volume. Unit Costs can be either standard, actual, or market, and ideally represent marginal values (if "fully absorbed measures" are used, then the usefulness of allocated amounts is diminished.)

Allocated amounts are used in both Other Revenue and Indirect Expense calculations, wherein the allocated amounts are apportioned amongst all accounts in a group.

Miscellaneous calculation values may comprise, for example, the number of days in a profit measurement period, an equity allocation weighting, etc. These values are known as "modeling" parameters.

Amortization parameters are used in interest amortization, which requires interest rates and life values used by straight line amortization and by declining balance of amortization.

Risk measurement parameters are used in Risk Provision calculations, which require various factors, such as: loss rates, reserve percentages, exposure factors, recovery rates, default probabilities and collection costs.

Tax rates are required for after-tax profit calculation. The Value Analyzer is designed to calculate pre-tax income on a taxable equivalent basis (where an effective tax rate is all that is required to transform pre-tax income into after tax earnings, i.e., Profit).

Rules

The Profitability Calculations 200 use one or more Rules 210 applied to data retrieved from the RDBMS 106. These Rules 210 include, inter alia, the following:

Treatments

Every account with cash flows affecting a organization's balance sheet requires a method of valuing the account's use of internal funds. One approach is "matched maturity funds transfer pricing," which uses a canonical representation of an account's funding characteristics and then determines a value based on adjusted market yields for each instance that requires an interest rate transfer price to calculate an account's marginal Net Interest Revenue.

Equity Allocation

In order to provide precise Net Interest Revenue calculations, the amount of equity funds required at an account must be determined. This rule allows for equity allocation using any of the following methods: simple ratios; regulatory definitions; economic allocations, or user defined allocations.

Apportionment

Other Revenue, Risk Provision and Indirect Expense calculations are applied at the account level using Organization Attributes 206 that are not related directly to account activity. These profit adjustments are made so that the sum of all account-level Profitability Calculations 200 comprises the overall profit. One approach is to pool indirect costs and revenues and then apportion them. Apportionment rules specify how the pooled indirect costs and revenues is completely allocated to appropriate accounts, wherein the preferred embodiment uses closed form allocation rules, which require only information known in the current period and not iterative computation.

Amortization

Some types of income or expense are deferred or accrued over multiple periods, including and subsequent to the current accounting period. This is common to accrual accounting methods used in profit presentations of financial statements, and gives rise to timing differences between cash flows and their related profit as presented in a financial statement in any accounting period. Since the Value Analyzer is designed to reconcile to the financial statement's profit values, it supports deferral and accrual accounting principles. Amortization methods that account for these timing differences are: interest amortization (used for interest income and expense accruals and for deferral of fees that are in lieu of interest), and straight line or declining balance amortizations (used for cost deferrals and investment depreciation).

Other Revenue Pricing

In situations where account and event activity can be used to derive account level income or fees, the Value Analyzer calculates these drivers of the profitability in the Other Revenue calculations. These calculations comprise linear combinations of event or account values and modeled coefficients.

Direct Expense

The calculation of account profit adjustments due to account-related activity requires rules that take the form of linear combinations of event or account values and modeled coefficients.

Indirect Expense

In situations where expense apportionment or amortization amounts are aggregated, the user may want different rules applied depending on the path (or dimension) of aggregation. These rules allow for multiple profit calculations rules to be applied to derive multiple account level Indirect Expense amounts.

Risk Provision

Adjusting current profit for expected future losses is known as "actuarial" profit provisioning. The Value Analyzer applies actuarial-based methods in its account level profit calculations, where the actuarial reserve that the provisions maintain represents the expected loss associated with all accounts.

Taxable Equivalent Gross-up

Profit is an after-tax measure, and thus some events or portions of some accounts' profits may be excluded from normal taxation. The Value Analyzer adjusts these pre-tax values, so that a singular tax rate can be used to convert pre-tax profit into after-tax values, which are also known as taxable equivalent adjustment. These rules use account and event attributes to adjust each of the five factors of the FFAPM to a taxable equivalent basis.

Interest Yield Adjustments

Since the Value Analyzer can calculate profits for any number of periods, the adjustment of cash interest payments, and the financial statement's accrual or smoothed representation of interest-related Profit, the Value Analyzer provides a method for converting cash interest amounts to accrual amounts for financial statements. The Value Analyzer implements an "effective interest rate" conversion to accomplish this type of calculation.

Profitability Calculations

The following describes the method used by the Profit Calculations 200:

1. Retrieve data from the RDBMS 106.
2. Calculate Net Interest Revenue for every account.
3. Calculate Other Revenue for every account.
4. Calculate Direct Expense for every account.
5. Calculate Indirect Expense for every account.
6. Calculate Risk Provision for every account.
7. Calculate Profit for every account.
8. Store the FFAPM Profit and the five factors of FFAPM into the RDBMS 106.
9. Aggregate and/or re-calculate the FFAPM Profit and the five factors of FFAPM as necessary.

Note that steps 2 through 6 perform account-level calculations. Steps 2, 3, 4, 5, and 6 can be performed independently and in parallel, while step 7 requires values derived in steps 2, 3, 4, 5, and 6, and therefore must be performed after steps 2, 3, 4, 5, and 6 are completed.

Output Definition

The Profit Calculations 200 generate one or more values for the five factors of the FFAPM 210, and specifically, the NIR, OR, DE, IE, RP, and Profit values. These values are used to generate the output data 214, which can be stored by the RDBMS 106 in the relational database.

Analytic Variations

The Value Analyzer operates on data and calculations across a continuum, in order to provide the analytic variations necessary for financial processing at various levels of aggregation. This continuum is comprised of multiple tiers as described below:

basic→intermediate→advanced→breakthrough.

Not every tier is necessarily present for each element of data or every calculation.

This continuum embodies the notion of inheritance, wherein the data and calculations of the higher tiers embody the data and calculations of the lower tiers. The principle of inheritance means that the data and calculations by which the separate tiers are defined are nested, i.e., the definition of "intermediate" includes the definition of "basic," but with added functionality that goes beyond "basic," and so on. Thus, there is consistency in the data and calculations performed at the different tiers in the continuum.

Shareholder Value Add

Shareholder Value Add (SVA) is used to calculate Earnings, and is a method that Financial Institutions use to adjust Profit for risk. The idea is to subtract the cost of the equity required to support the profit measure from the profit measure. Financial Institutions use this risk adjustment measure to penalize the profit for risk. These Financial Institutions classify cohorts of risk and the pre-tax risk cost equivalent as a percentage of account balance or allocated equity (i.e., "Hurdles"). For Financial Institutions that do not use the Economic-Value-Add profit measures (SVA=0), calculations of Return on Equity or Return on Assets are left to the Financial Institution's specific routines, reports, or views.

For those Financial Institutions that do use SVA calculations, the formula comprises the following:

$$E(a_i)=[NIR(a_i)+OR(a_i)-DE(a_i)-IE(a_i)-RP(a_i)-SVA(a_i)]*(1-\text{EffectiveTaxRate})$$

or $$E(a_i)=[\text{Profit}(a_i)-SVA(a_i)]*(1-\text{EffectiveTaxRate})$$

wherein:

EffectiveTaxRate=$(1-\text{tax rate}_2)*(\text{tax rate}_1)+\text{tax rate}_2$, tax rate$_1$ and tax rate$_2$ are effective rates, tax rate$_2$ is deducted from income, and tax rate$_1$ is not deducted from income (e.g., tax rate$_1$ is a federal income tax rate and tax rate$_2$ is a state income tax rate), SVA($a_i$)=Risk Adjusted Hurdle Rate*Allocated Capital, Risk Adjusted Hurdle Rate=$\alpha+\beta(a_i)*x$, $\alpha$ is a risk free rate on capital, x is a market premium of a Financial Institution's capital relative to the market, and $\beta(a_i)$ is a function of a cohort of accounts in which $a_i$ is a member.

The Financial Institution supplies these items.

As above:

$$\text{Total Earnings} = \sum_i [E(a_i)]$$

Logic of the Preferred Embodiment

Figure 3:
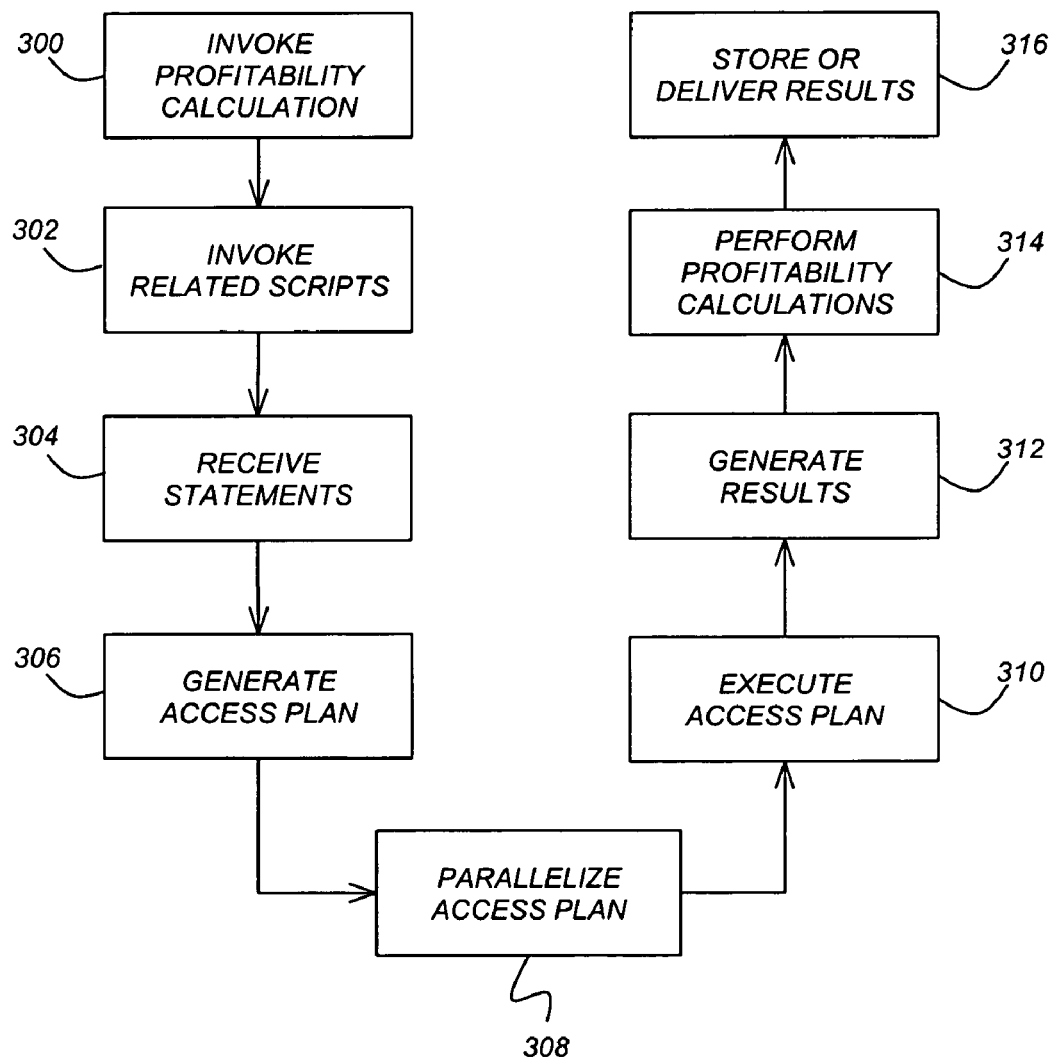
FIG. 3 is a flow chart illustrating the steps necessary for the execution of Profitability Calculations according to the preferred embodiment of the present invention.

FIG. 3 is a flow chart illustrating the steps necessary for the execution of Profitability Calculations 200 according to the preferred embodiment of the present invention. Those skilled in the art will recognize that this logic is provided for illustrative purposes only and that different logic may be used to accomplish the same results.

Block 300 represents the Value Analyzer Client 102 invoking one or more Profitability Calculations 200 in the Value Analyzer Calculation Engine 104.

Block 302 represents the Value Analyzer Calculation Engine 104 invoking one or more scripts related to the invoked Profitability Calculations 200, wherein the scripts comprise SQL statements that are transmitted to the RDBMS 106. These SQL statements access account, event and organization attributes from the database managed by the RDBMS 106.

Block 304 represents the Parsing Engine 108 of the RDBMS 106 receiving the SQL statements and transforming the statements into an operator tree.

Block 306 represents the Parsing Engine 108 of the RDBMS 106 generating one or more access plans from the operator tree.

Block 308 represents the Parsing Engine 108 of the RDBMS 106 parallelizing the access plans, and then transmitting the access plans to their assigned Access Module Processors 110A-E of the RDBMS 106.

Block 310 represents the Access Module Processors 110A-E of the RDBMS 106 performing the required data manipulation associated with the access plans received from the Parsing Engine 108, wherein the access plans are performed in parallel by the Access Module Processors 110A-E.

Block 312 represents the Parsing Engine 108 of the RDBMS 106 merging the results received from the Access Module Processors 110A-E and providing the merged results to the Value Analyzer Calculation Engine 104 as account, event and organization attributes.

Block 314 represents the Value Analyzer Calculation Engine 104 performing the invoked Profitability Calculations 200 using the account, event and organization attributes accessed from the RDBMS 106, as well as one or more profit factors and one or more rules. In this Block, the Profitability Calculations 200 comprise:

| Profit ($a_i$) | = | Net Interest Revenue (NIR) ($a_i$) |
|---|---|---|
| | + | Other Revenue (OR) ($a_i$) |
| | − | Direct Expense (DE) ($a_i$) |
| | − | Indirect Expense (IE) ($a_i$) |
| | − | Risk Provision (RP) ($a_i$) | for an account $a_i$.

In Block 314, invoked Profitability Calculations 200 also perform one or more earnings calculations using results from the Profitability Calculations 200, as well as shareholder value add attributes and tax adjustment attributes accessed from the database. These earnings calculations comprise the following:

$$E(a_i)=[NIR(a_i)+OR(a_i)-DE(a_i)-IE(a_i)-RP(a_i)-SVA(a_i)]*(1-\text{EffectiveTaxRate})$$

or $$E(a_i)=[\text{Profit}(a_i)-SVA(a_i)]*(1-\text{EffectiveTaxRate})$$

wherein:

EffectiveTaxRate=$(1-\text{tax rate}_2)*(\text{tax rate}_1)+\text{tax rate}_2$, tax rate$_1$ and tax rate$_2$ are effective rates, tax rate$_2$ is deducted from income, and tax rate$_1$ is not deducted from income (e.g., tax rate$_1$ is a federal income tax rate and tax rate$_2$ is a state income tax rate), SVA($a_i$)=Risk Adjusted Hurdle Rate*Allocated Capital, Risk Adjusted Hurdle Rate=$\alpha+\beta(a_i)*x$, $\alpha$ is a risk free rate on capital, x is a market premium of a Financial Institution's capital relative to the market, and $\beta(a_i)$ is a function of a cohort of accounts in which $a_i$ is a member.

In Block 314, invoked Profitability Calculations 200 also perform one or more total earnings calculations in the computer using results from the earnings calculations. The total earnings calculations comprise:

$$\text{Total Earnings} = \sum_i [\text{Earnings}(a_i)]$$

for all accounts $a_i$.

Block 316 represents the Value Analyzer Calculation Engine 104 delivering the output or results from the invoked Profitability Calculations 200 to the Value Analyzer Client 102 and/or the RDBMS 106. With regard to the Value Analyzer Client 102, the results may be presented to the user, printed, or used by various other computer programs, as desired. With regard to the RDBMS 106, the results may be stored for later use by the Value Analyzer Calculation Engine 104, or other computer programs, as desired.

CONCLUSION

This concludes the description of the preferred embodiment of the invention. The following paragraphs describe some alternative embodiments for accomplishing the same invention.

In one alternative embodiment, any type of computer or configuration of computers could be used to implement the present invention. In addition, any database management system, decision support system, on-line analytic processing system, or other computer program that performs similar functions could be used with the present invention.

In summary, the present invention discloses a Value Analyzer, which is a data-driven computer-facilitated financial processing system that accesses account, event and organization attributes from a relational database management database, wherein: (1) the account attributes comprise data about accounts being measured, (2) the event attributes comprise data about account-related transactions, and (3) the organization attributes comprise data about the organization's financial status. Profitability calculations are performed in the computer using the account, event and organization attributes accessed from the relational database management system, as well as one or more profit factors and one or more rules. The profitability calculations comprise the following:

| Profit $(a_i)$ | = | Net Interest Revenue (NIR) $(a_i)$ |
|---|---|---|
| | + | Other Revenue (OR) $(a_i)$ |
| | − | Direct Expense (DE) $(a_i)$ |
| | − | Indirect Expense (IE) $(a_i)$ |
| | − | Risk Provision (RP) $(a_i)$ | for an account $a_i$.

Thereafter, one or more earnings calculations are performed in the computer using results from the profitability calculations, as well as shareholder value add attributes and tax adjustment attributes accessed from the database. The earnings calculations comprise the following:

$$E(a_i)=[NIR(a_i)+OR(a_i)-DE(a_i)-IE(a_i)-RP(a_i)-SVA(a_i)]*(1-\text{EffectiveTaxRate})$$

or $$E(a_i)=[\text{Profit}(a_i)-SVA(a_i)]*(1-\text{EffectiveTaxRate})$$

wherein:

EffectiveTaxRate=$(1-\text{tax rate}_2)*(\text{tax rate}_1)+\text{tax rate}_2$, wherein tax rate$_1$ and tax rate$_2$ are effective rates, tax rate$_2$ is deducted from income, and tax rate$_1$ is not deducted from income (e.g., tax rate$_1$ is a federal income tax rate and tax rate$_2$ is a state income tax rate), SVA$(a_i)$=Risk Adjusted Hurdle Rate*Allocated Capital, Risk Adjusted Hurdle Rate=$\alpha+\beta(a_i)*x$, $\alpha$ is a risk free rate on capital, x is a market premium of a Financial Institution's capital relative to the market, and $\beta(a_i)$ is a function of a cohort of accounts in which $a_i$ is a member.

Finally, one or more total earnings calculations are performed in the computer using results from the earnings calculations. The total earnings calculations comprise the following:

$$\text{Total Earnings} = \sum_i [\text{Earnings}(a_i)]$$

for all accounts $a_i$.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of performing financial processing in a computer, comprising:
   (a) accessing account, event and organization attributes from a database accessible by the computer, wherein: (1) the account attributes comprise data about accounts being measured, (2) the event attributes comprise data about account-related transactions, and (3) the organization attributes comprise data about the organization's financial status;
   (b) performing one or more profitability calculations in the computer using the account, event and organization attributes accessed from the database, as well as one or more profit factors and one or more rules, wherein the profitability calculations comprise:

| Profit $(a_i)$ | = | Net Interest Revenue (NIR) $(a_i)$ |
|---|---|---|
| | + | Other Revenue (OR) $(a_i)$ |
| | − | Direct Expense (DE) $(a_i)$ |
| | − | Indirect Expense (IE) $(a_i)$ |
| | − | Risk Provision (RP) $(a_i)$. | for an account $a_i$, and
   (c) performing one or more earnings calculations in the computer using results from the profitability calculations, as well as shareholder value add attributes and tax adjustment attributes accessed from the database, wherein the earnings calculations comprise:

$$E(a_i)=[\text{Profit}(a_i)-SVA(a_i)]*(1-\text{EffectiveTaxRate})$$

wherein:

EffectiveTaxRate=$(1-\text{tax rate}_2)*(\text{tax rate}_1)+\text{tax rate}_2$, tax rate$_1$ and tax rate$_2$ are effective rates, tax rate$_2$ is deducted from income, and tax rate$_1$ is not deducted from income, SVA$(a_i)$=Risk Adjusted Hurdle Rate Allocated Capital, Risk Adjusted Hurdle Rate=$\alpha+\beta(a_i)*x$, $\alpha$ is a risk free rate on capital, x is a market premium of a Financial Institution's capital relative to the market, and $\beta(a_i)$ is a function of a cohort of accounts in which $a_1$ is a member.

2. The method of claim 1, further comprising performing one or more total earnings calculations in the computer using results from the earnings calculations, wherein the total earnings calculations comprise:

$$\text{Total Earnings} = \sum_i [\text{Earnings}(a_i)]$$

for all accounts $a_i$.

3. A system for financial processing, comprising:
   a computer;
   logic, performed by the computer, for:
      (a) accessing account, event and organization attributes from a database accessible by the computer, wherein:

(1) the account attributes comprise data about accounts being measured, (2) the event attributes comprise data about account-related transactions, and (3) the organization attributes comprise data about the organization's financial status;

(b) performing one or more profitability calculations in the computer using the account, event and organization attributes accessed from the database, as well as one or more profit factors and one or more rules, wherein the profitability calculations comprise:

| Profit ($a_i$) | = | Net Interest Revenue (NIR) ($a_i$) |
|---|---|---|
| | + | Other Revenue (OR) ($a_i$) |
| | − | Direct Expense (DE) ($a_i$) |
| | − | Indirect Expense (IE) ($a_i$) |
| | − | Risk Provision (RP) ($a_i$). | for an account $a_i$, (c) performing one or more earnings calculations in the computer using results from the profitability calculations, as well as shareholder value add attributes and tax adjustment attributes accessed from the database, wherein the earnings calculations comprise:

$$E(a_i)=[Profit(a_i)-SVA(a_i)]*(1-EffectiveTaxRate)$$

wherein:
EffectiveTaxRate=$(1-\text{tax rate}_2)*(\text{tax rate}_1)+\text{tax rate}_2$, tax rate$_1$ and tax rate$_2$ are effective rates, tax rate$_2$ is deducted from income, and tax rate$_1$ is not deducted from income, SVA($a_i$)=Risk Adjusted Hurdle Rate*Allocated Capital, Risk Adjusted Hurdle Rate=$\alpha+\beta(a_i)*x$, $\alpha$ is a risk free rate on capital, x is a market premium of a Financial Institution's capital relative to the market, and $\beta(a_i)$ is a function of a cohort of accounts in which $a_i$ is a member.

4. The system of claim 3, further comprising logic for performing one or more total earnings calculations in the computer using results from the earnings calculations, wherein the total earnings calculations comprise:

$$\text{Total Earnings} = \sum_i [\text{Earnings}(a_i)]$$

for all accounts $a_i$.

5. An article of manufacture embodying logic for performing financial processing in a computer, comprising:

(a) accessing account, event and organization attributes from a database accessible by the computer, wherein: (1) the account attributes comprise data about accounts being measured, (2) the event attributes comprise data about account-related transactions, and (3) the organization attributes comprise data about the organization's financial status;

(b) performing one or more profitability calculations in the computer using the account, event and organization attributes accessed from the database, as well as one or more profit factors and one or more rules, wherein the profitability calculations comprise:

| Profit ($a_i$) | = | Net Interest Revenue (NIR) ($a_i$) |
|---|---|---|
| | + | Other Revenue (OR) ($a_i$) |
| | − | Direct Expense (DE) ($a_i$) |
| | − | Indirect Expense (IE) ($a_i$) |
| | − | Risk Provision (RP) ($a_i$). | for an account $a_i$, and (c) performing one or more earnings calculations in the computer using results from the profitability calculations, as well as shareholder value add attributes and tax adjustment attributes accessed from the database, wherein the earnings calculations comprise:

$$E(a_i)=[Profit(a_i)-SVA(a_i)]*(1-EffectiveTaxRate)$$

wherein:
EffectiveTaxRate=$(1-\text{tax rate}_2)*(\text{tax rate}_1)+\text{tax rate}_2$, tax rate$_1$ and tax rate$_2$ are effective rates, tax rate$_2$ is deducted from income, and tax rate$_1$ is not deducted from income, SVA($a_i$)=Risk Adjusted Hurdle Rate*Allocated Capital, Risk Adjusted Hurdle Rate=$\alpha+\beta(a_i)*x$, $\alpha$ is a risk free rate on capital, x is a market premium of a Financial Institution's capital relative to the market, and $\beta(a_i)$ is a function of a cohort of accounts in which $a_i$ is a member.

6. The article of manufacture of claim 5, further comprising performing one or more total earnings calculations in the computer using results from the earnings calculations, wherein the total earnings calculations comprise:

$$\text{Total Earnings} = \sum_i [\text{Earnings}(a_i)]$$

for all accounts $a_i$.

* * * * *